(12) United States Patent
Koike et al.

(10) Patent No.: US 10,562,567 B2
(45) Date of Patent: Feb. 18, 2020

(54) WORK VEHICLE

(71) Applicant: Kubota Corporation, Osaka-shi (JP)

(72) Inventors: Kazuo Koike, Sakai (JP); Hirokazu Ito, Sakai (JP)

(73) Assignee: Kubota Corporation, Osaka (JP)

( * ) Notice: Subject to any disclaimer, the term of this patent is extended or adjusted under 35 U.S.C. 154(b) by 139 days.

(21) Appl. No.: 15/825,412

(22) Filed: Nov. 29, 2017

(65) Prior Publication Data

US 2018/0303027 A1    Oct. 25, 2018

(30) Foreign Application Priority Data

Apr. 24, 2017   (JP) .................................. 2017-085503

(51) Int. Cl.
| | | |
|---|---|---|
| *B62D 11/04* | (2006.01) | |
| *B60K 7/00* | (2006.01) | |
| *A01D 69/02* | (2006.01) | |
| *B62D 11/00* | (2006.01) | |
| *A01D 101/00* | (2006.01) | |

(52) U.S. Cl.
CPC .............. *B62D 11/04* (2013.01); *A01D 69/02* (2013.01); *B60K 7/0007* (2013.01); *B62D 11/003* (2013.01); *A01D 2101/00* (2013.01); *B60L 2210/40* (2013.01); *B60L 2240/12* (2013.01)

(58) Field of Classification Search
CPC . B62D 11/04; B60K 1/02; B60K 1/04; B60K 7/0007
See application file for complete search history.

(56) References Cited

U.S. PATENT DOCUMENTS

| | | | |
|---|---|---|---|
| 9,731,760 B2* | 8/2017 | Ito ............................ | B62D 1/02 |
| 2012/0323420 A1 | 12/2012 | Koike et al. | |
| 2016/0347364 A1* | 12/2016 | Eavenson, Sr. ....... | B62D 11/003 |
| 2018/0237014 A1* | 8/2018 | Nasu ........................ | B60K 1/02 |
| 2018/0326860 A1* | 11/2018 | Ito ............................ | B60L 58/12 |

FOREIGN PATENT DOCUMENTS

JP          2013001228 A      1/2013

* cited by examiner

*Primary Examiner* — Kevin Hurley
(74) *Attorney, Agent, or Firm* — The Webb Law Firm

(57) ABSTRACT

A work vehicle includes a battery that outputs a DC power, at least two electric motors, and at least two inverters, each inverter being configured to convert the DC power from the battery into an AC power and to supply the AC power to one of the electric motors. The work vehicle further includes an accommodation box attachable/detachable to/from the vehicle body, the accommodation box accommodating a plurality of electrical equipments including the inverters.

5 Claims, 5 Drawing Sheets

WORK VEHICLE

CROSS-REFERENCE TO RELATED APPLICATION

This application claims priority to Japanese Patent Application No. 2017-085503 filed Apr. 24, 2017, the disclosure of which is hereby incorporated in its entirety by reference.

BACKGROUND OF THE INVENTION

1. Field of the Invention

This invention is directed to a work vehicle such as an electric grass mower, a lawn tractor, etc.

2. Description of the Related Art

In recent years, in work vehicles, for the purpose of saving of electric power consumption by increasing a voltage and reducing a supply current, or for the purpose of hybridization or electrification of the work vehicle, it is contemplated to mount high-voltage electrical equipments such as a battery that outputs a DC current of a high voltage such as 48V, a plurality of electric motors, a plurality of inverters, or step-down converters, in addition to 5V type low-voltage electrical equipments such as analog sensors for low voltages and 12V type electronic control unit, switches, etc.

As an electric grass mower as one example of such work vehicle, there is known an electric grass mower that includes: high-voltage electrical equipments such as a battery that outputs a high-voltage direct current power (equal to or higher than 36V); right and left traveling electric motors for driving right and left rear wheels; three cutter blade electric motors for rotatably driving three rotary cutter blades; two traveling inverters (motor controllers) for converting the DC current from the battery into AC current and feeding this AC current to respective traveling electric motors; two cutter blade inverters (motor controllers) for converting the DC current from the battery into AC current and feeding this AC current to respective cutter blade electric motors; and a DC/DC converter configured to convert the high-voltage electric power (equal to or higher than 36V) into a low-voltage electric power (12V), etc., in addition to the low voltage electrical equipments such as a controller and right and left rotation sensors (see e.g. JP 2013-001228 A or US 2012/0323420 A1 corresponding thereto).

With the electric grass mower as described above, the high-voltage electrical equipments such as the two traveling inverters, the cutter blade inverters and the DC/DC converter are disassembled and then assembled with the vehicle body individually. Thus, there remains room for improvement in the respect of higher readiness of assembly of the high-voltage electrical equipments. Further, since there arises a need for providing measures for electric shock protection, dust protection, water protection individually, there remains another room for improvement in the respect of reducing the man-hours and costs required for electric shock protection measure, etc., too.

Namely, there is a need for a work vehicle that can save man-hours and costs required for the electric shock protection measure, etc. against such high-voltage electrical equipments, while improving the assembly readiness of the electrical equipments.

SUMMARY OF THE INVENTION

In view thereof, there is proposed a work vehicle comprising:

a vehicle body;
a battery that outputs a direct current (DC) power;
at least two electric motors;
at least two inverters, each of the inverters being configured to convert the DC power from the battery into an alternate current (AC) power and to supply the AC power to one of the electric motors associated therewith: and
an accommodation box attachable/detachable to/from the vehicle body, the accommodation box accommodating a plurality of electrical equipments including the inverters.

With this work vehicle, the electrical equipments including at least two inverters (in particular, a plurality of high-voltage electrical equipments for high-voltage application) can be modularized. With this, attachment and detachment of each electrical equipment to/from the vehicle body involve only attachment/detachment of the accommodation box to/from the vehicle body. As a result, in comparison with individual attachment/detachment of each electrical equipment to/from the vehicle body, attachment/detachment of each electrical equipment to/from the vehicle body is made easy, to thereby improve the readiness of assembly and maintenance of each electrical equipment.

Further, the electric shock protection, dust protection and water protection measures for the plurality of electrical equipments (in particular, the high-voltage electrical equipments) including the two inverters accommodated in the accommodation box can be done at one time together, thus eliminating the need for providing such measures individually. As a result, saving of man-hours and costs required for electric shock protection measure, etc. can be realized.

It should be noted that the term "high-voltage" in the language "high-voltage electrical equipment" as used herein is to be understood that the term is not limited to "36V or higher" or "48V or higher" illustrated in the detailed disclosure, but to be understood that the term is to include other specifications or standards for relatively high voltage applications.

According to one preferred embodiment, the work vehicle further comprises a right traveling device and a left traveling device that support the vehicle body;

wherein the electric motors include at least one right traveling motor for driving the right traveling device and at least one left traveling motor for driving the left traveling device; and the inverters include at least two traveling inverters for supplying the AC power to one of the traveling motors associated therewith.

With this arrangement, it is possible to modularize the plurality of electrical equipments for high-voltage application including two traveling inverters, so that the readiness of assembly and maintenance is improved, and man-hours and costs required for electric shock protection measure, etc. can be saved.

According to one preferred embodiment, the work vehicle further comprises:

a right traveling device and a left traveling device that support the vehicle body;

an implement device configured to be detachably connected to the vehicle body;

wherein the electric motors include at least one right traveling motor for driving the right traveling device, at least one left traveling motor for driving the left traveling device, and at least one implement motor for driving the implement device;

the inverters include a traveling inverter for supplying the AC power to one of the traveling motors associated therewith, and an implement inverter for supplying the AC power to the implement motor.

With this arrangement, it is possible to modularize the plurality of electrical equipments for high-voltage application including the traveling inverter and the implement inverter, so that the readiness of assembly and maintenance is improved, and man-hours and costs required for electric shock protection measure, etc. can be saves.

According to one preferred embodiment, the accommodation box is disposed adjacent to the battery and the electric motors.

With this arrangement, the length of high-voltage cables extending from the plurality of electrical equipments accommodated in the accommodation box to the battery or the electric motors can be formed short. As a result, reduction in electric power loss and reduction of cost can be achieved.

According to one preferred embodiment, the accommodation box includes a wall-face forming member that supports the inverters; and the wall-face forming member functions as a heat sink.

With this arrangement, heat generated from the respective inverter can be discharged speedily to the outside of the accommodation box via the wall-face forming member. As a result, is possible to suppress rise of temperature inside the accommodation box due to heat generation from each inverter.

Other aspects of the invention and advantages/effects invited therefrom will be apparent upon reading following description with reference to the drawings.

DETAILED DESCRIPTION OF PREFERRED EMBODIMENTS

Figure 1:
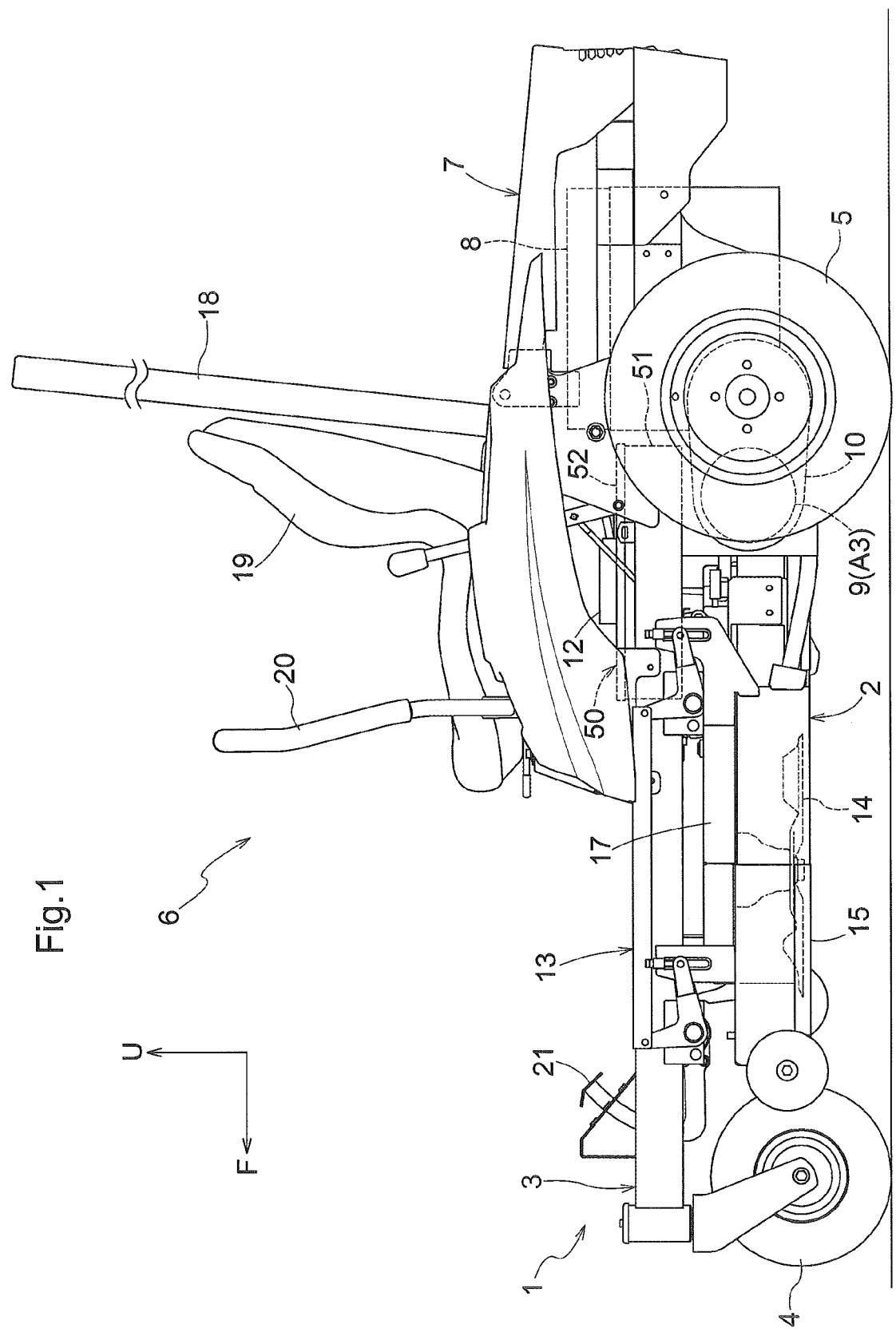
FIG. 1 is a left side view of an electric grass mower as one example of a work vehicle, according to one embodiment of the work vehicle (same applied to the subsequent drawings up to FIG. 4)

In the following description, the direction denoted with the arrow of a mark (F) in FIG. 1 is the front side of an electric grass mower, and the direction denoted with the arrow of a mark (U) in the same is the upper side of the electric grass mower. Also, the direction denoted with the arrow of a mark (F) in FIG. 2 is the front side of the electric grass mower and the direction denoted with the arrow of a mark (R) in the same is the right side of the electric grass mower.

[General Configuration of Electric Grass Mower]

Figure 2:
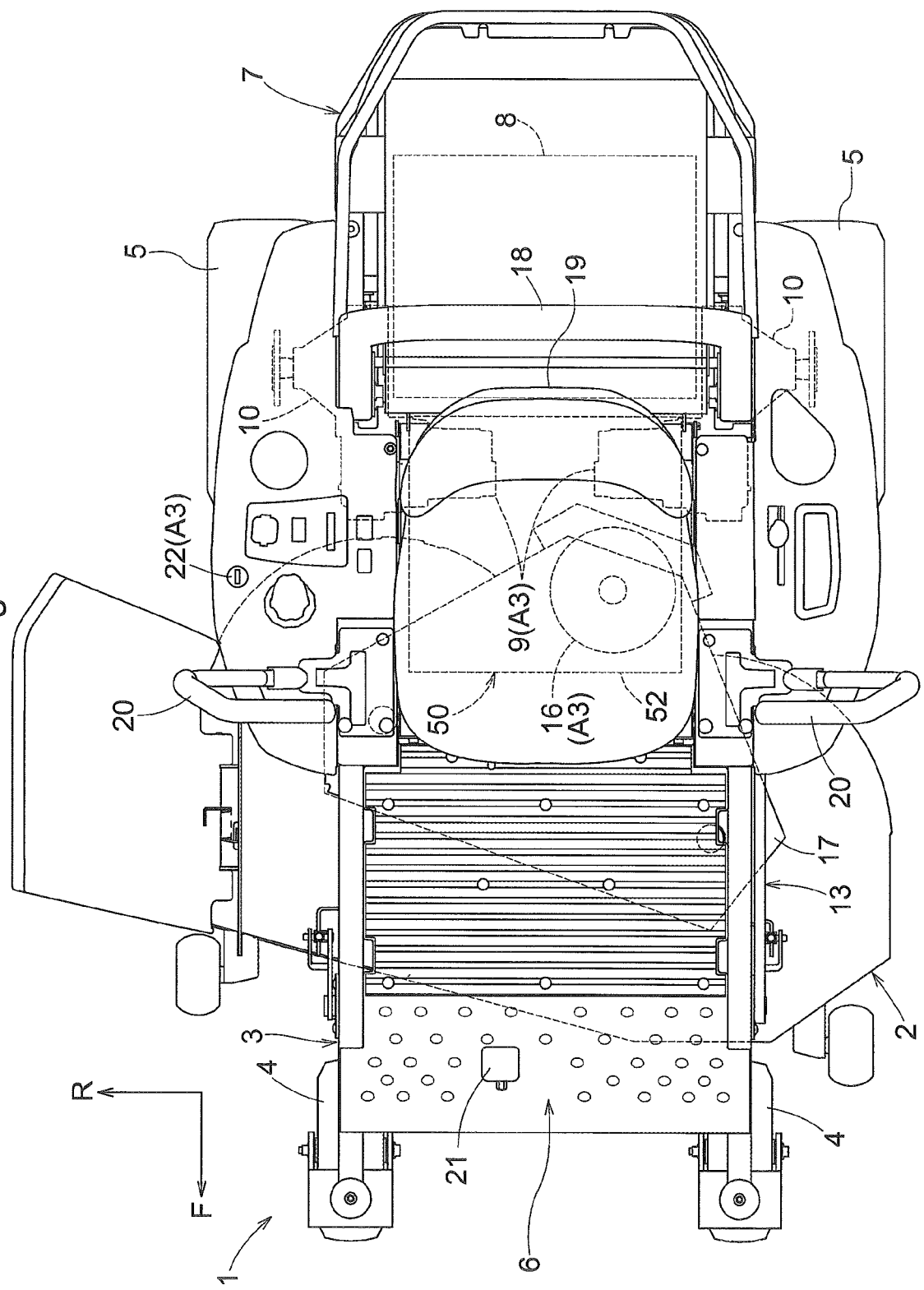
FIG. 2 is a plan view of the electric grass mower.

As shown in FIGS. 1-2, an electric grass mower (an example of a work vehicle) includes a riding type traveling vehicle body 1 and a mower unit 2 (an example of an implement device) supported in suspension from a front-rear intermediate lower portion of the traveling vehicle body 1 to be liftable up/down.

Figure 3:
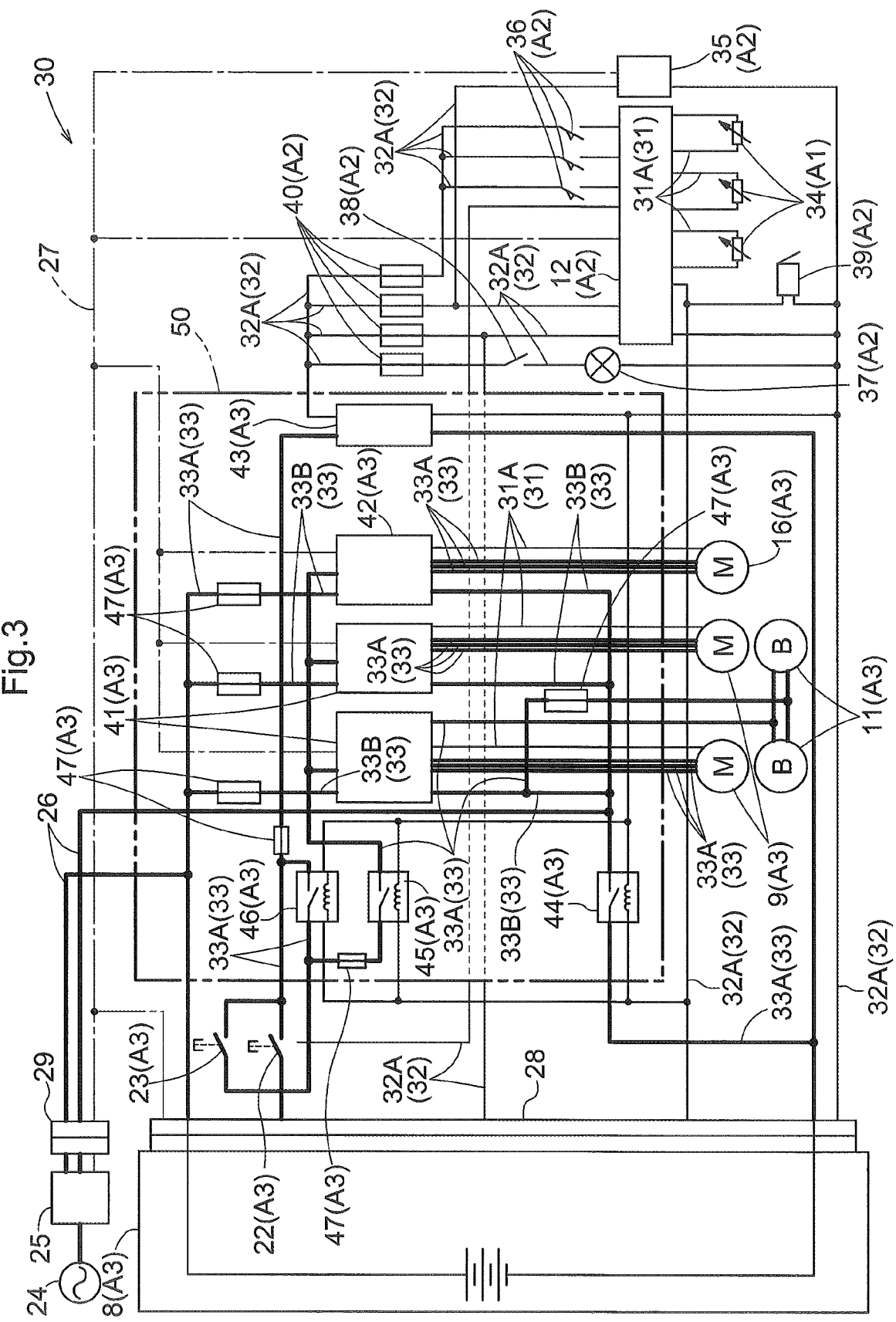
FIG. 3 is an electric circuit diagram of the electric grass mower.

As shown in FIGS. 1-3, the traveling vehicle body 1 includes: a vehicle body frame 3 forming a framework of the traveling vehicle body 1; caster type right and left front wheels (an example of a traveling device) 4; right and left rear wheels (an example of the traveling device) 5 that are driven at different speeds independently of each other; a riding type driving section 6 disposed on a front side of the traveling vehicle body 1; a battery accommodation portion 7 disposed at a rear portion of the traveling vehicle body 1; a rechargeable type battery 8 accommodated in the battery accommodation portion 7; right and left traveling motors (an example of an electrical equipment) 9 for driving the right and left rear wheels 5; right and left gear type speed reduction devices 10 for speed-reducing power from the right and left traveling motors 9 and transmitting the speed-changed power to the right and left rear wheels 5; right and left electromagnetic brakes (an example of the electrical equipment) 11 for braking the right and left rear wheels 5; an electronic control unit (to be referred to as "ECU" hereinafter) 12 for controlling operations of the right and left traveling motors 9, etc.; and a parallel link type link mechanism 13 for supporting the mower unit 2 in suspension for allowing its lifting up/down.

The mower unit 2 is mounted between the right and left front wheels 4 and the right and left rear wheels 5. The mower unit 2 includes: a plurality of blades 14 which are rotatably driven; a housing 15 that covers the respective blades 14 from the upper side thereof; an implement motor (an example of the electrical equipment) 16 supported by the housing at a rear portion thereof; a belt type transmission device (not shown) for transmitting power from the implement motor 16 to the respective blade 14; and a transmission cover 17 that covers the implement motor 16 and the belt type transmission device.

As shown in FIGS. 1 and 2, the vehicle body frame 3 includes an arch-shaped ROPS (rollover protection structure) frame 18, etc. The right and left front wheels 4 are supportingly connected to the vehicle body frame 3 to be changeable in their orientations. The right and left rear wheels 5 are supportingly connected to the vehicle body frame 3 via the right and left gear type speed reduction devices 10, etc.

As shown in FIGS. 1-3, the driving section 6 includes: a driver's seat 19 supported by the vehicle body frame 3 at a front-rear intermediate portion thereof; right and left speed changer levers 20 disposed on right and left opposed sides of the driver's seat 19; a lift pedal 21 disposed at a foot portion of the driving section 6; a key operation type main switch (an example of the electrical equipment) 22 for switching ON/OFF electric power supply from the battery 8 to the respective electrical equipments including the ECU 12; a charging switch (an example of the electrical equipment) 23 for instructing the ECU 12 to start charging of the battery 8. Though not shown, the right and left speed changer levers 20 are of a pivot operation type and operational positions thereof are inputted via right and left lever sensors (an example of electrical equipment) to the ECU 12. Based on inputs from the right and left lever sensors, the ECU 12 executes traveling control for controlling outputs of the right and left traveling motors 9. With this traveling control, by pivotally operating the right and left speed changer levers 20, an operator can effect switchover of the traveling state of the traveling vehicle body 1 to/among a forward straight traveling state in which the right and left rear wheels 5 are driven to rotate forwardly at an equal speed; a forward turning state in which the right and left rear wheels 5 are driven to rotate forwardly at different speeds from each other; a reverse straight traveling state in which the right and left rear wheels 5 are driven to rotate in reverse at an equal speed; a reverse turning state in which the right and left rear wheels 5 are driven to rotate in reverse at different speeds from each other; a pivot turning state in which while one of the right and left rear wheels 5 is stopped; the other thereof is driven forwardly or in reverse; and a spin turning state in which the right and left rear wheels 5 are driven in different directions from each other.

Namely, this electric grass mower is a so-called zero turn mower configured to be capable of switch over its traveling state to one of the forward and reverse straight traveling states and various turning states including the right and left spin turning states, by operations on the right and left speed changer levers 20.

As shown in FIG. 1, the lift pedal 21 is operably coupled to the link mechanism 13. With this operable coupling, by effecting a step-on operation on the lift pedal 21, the operator can elevate the mower unit 2 to an upper evacuation position. Further, by releasing a step-on operation on the lift pedal 21, the operator can lower the mower unit 2 to a lower working position.

[Electric System of Electric Grass Mower]

As shown in FIGS. 2-3, the main switch 22 is configured to be operable to three positions, i.e. an OFF position for stopping electric power supply from the battery 8 to the respective electrical equipments; an ON position for supplying electric power to the ECU 12, etc. for activating the ECU 12; and a START position for instructing the ECU 12 to start power supply to the respective motors 9, 16. The charging switch 23 is a momentary switch which is returned to a state to stop power supply from the battery 8 to the ECU 12.

Though not shown, the battery 8 comprises a battery pack including a plurality of battery modules connected to output a high-voltage (e.g. 48V) DC electric power, a controller for monitoring and outputting voltages, temperatures of the like of the respective battery modules, sensors such as an ammeter, a thermistor, etc., which are all accommodated in a battery case. The ECU 12 is comprised of a microcomputer having a CPU (central processing unit), an EEPROM (electrically erasable programmable read-only memory), etc. The right and left traveling motors 9 and the implement motor 16 are DC motors (an example of the electrical equipment) which are operated by a three-phase electric power of a high voltage (e.g. 48V).

As shown in FIG. 3, the battery 8 is charged with electric power supplied from an external power source 24 which is a commercially available power supply via a charger 25, and a charging high-voltage cable 26, etc.

Though not shown, the charger 25 includes an AC-DC converter, a DC-DC converter, and an information management section for acquiring and managing information concerning charging. With this, the charger 25 converts the AC current from the external power source 24 into a high-voltage (e.g. 48V) DC power suited to the specification of the battery 8 and supplies this current to the battery 8.

As shown in FIG. 3, the information management section of the charger 25 is connected to the ECU 12 and the controller of the battery 8 via a communication line 27, etc. With this connection, the information management section can effect onboard communication with the ECU 12, the controller of the battery 8, etc. via a CAN (controller area network), for instance. The high-voltage cable 26 and the communication line 27 are connected to the battery 8 via a first connector 28 and also connected to the charger 25 via a second connector 29.

As shown in FIG. 3, an electric circuit 30 of this tractor includes: a first power supply path 31 for supplying power to respective 5V type first low-voltage electrical equipments A1 for low voltage applications via low-voltage cables 31A for 5V; a second power supply path 32 for supplying power to respective 12V type second low-voltage electrical equipments A2 for low voltage applications via low-voltage cables 31B for 12V; and a third power supply path 33 for supplying power to respective 48V electrical equipments via 48V high-voltage cables 33A and conductive bars 33B for high-voltage.

The respective first low-voltage electrical equipments A1 include: various types of analog sensors 34 such as rotary potentiometers used in the right and left lever sensors as described above; encoders (not shown) provided in the respective motors 9, 16, etc. The respective second low-voltage electrical equipments A2 include: the ECU 12; a meter 35 for displaying a vehicle speed; various instruction switches 36 such as a PTO switch for instructing the ECU 12 to stop power supply to the implement motor 16; front lamps 37 comprised of a plurality of LED's; a switch 38 for front lamp lighting; a reverse traveling alarming buzzer 39, and various fuses 40 for low voltage, etc. The respective high-voltage electrical equipments A3 include: the battery 8; the right and left traveling motors 9; the right and left electromagnetic brakes 11; the implement motor 16; the main switch 22; the charging switch 23; two traveling inverters 41; one implement inverter 42; a step-down converter 43; a main relay 44 for allowing/stopping power supply in the third power supply path 33; an inverter relay 45 for allowing/stopping power supply to the respective inverters 41, 42; a hold relay 46 for allowing power supply to the ECU 12 with bypassing the main switch 22; various fuses 47 for high-voltage, etc.

[Accommodation Box]

As shown in FIGS. 1-4, the traveling vehicle body 1 includes an accommodation box 50 attachable/detachable to/from the vehicle body. And, of the high-voltage electrical equipments A3 as described above, the respective traveling inverters 41, the implement inverter 42, the converter 43, the main relay 44, the inverter relay 45, the hold relay 46 and the various fuses 47 are accommodated in the accommodation box 50.

With the above arrangement, the plurality of high-voltage electrical equipments A3 such as the traveling inverters 41, the implement inverter 42 and the converter 43 can be modularized. With this, attachment/detachment of these respective high-voltage electrical equipments can be readily done as attachment/detachment of the accommodation box 50 to/from the vehicle body. As a result, in comparison with an arrangement of attaching/detaching the respective high-voltage electrical equipments A3 to/from the vehicle body individually, the attachment/detachment of the respective electrical equipments is made easier, whereby assembly and maintenance readiness of the respective high-voltage electrical equipments A3 is improved.

Further, measures for the electric shock protection, dust protection, water protection for the respective high-voltage electrical equipments A3 accommodated in the accommodation box 50 can be done at one time together via the accommodation box 50. So, there is no need to effect such measure individually. As a result, saving of man-hour and cost required for the measures for the electric shock protection, dust protection, water protection for the high-voltage electrical equipments A3 is made possible.

And, since the above arrangement provides not only accommodation of the above-described high-voltage electrical equipments A3 in the accommodation box 50, but also the ability of effecting connections of the high-voltage cables 33A to the respective high-voltage electrical equipments A3 inside the accommodation box 50, and connections of the high-voltage electrical equipments to each other via the conductive bars 33B inside the accommodation box 50, the arrangement can reduce the amount of exposure of the high-voltage electrical equipments A3, the high-voltage cables 33A and the conductive bars 33B to which high-voltage is applied and in which large electric current flows. Consequently, the risk of electric shock due to inadvertent contact with the high-voltage electrical equipments A3, the high-voltage cables 33A, etc. can be avoided advantageously.

Moreover, since the plurality of high-voltage electrical equipments A3, etc. can be disposed together in a compact manner within the accommodation box, in comparison with assembling the respective high-voltage electrical equipments A3, etc. individually to the vehicle body, space saving is made possible. And, since the length of the conductive bars 33B interconnecting the high-voltage electrical equipments inside the accommodation box is short, reduction of electric power loss and cost can be realized. Further, since the high-voltage cables 33A are separate from the other low-voltage cables 31A, 32A, inspection of the high-voltage cables 33A can be carried out easily.

Figure 4:
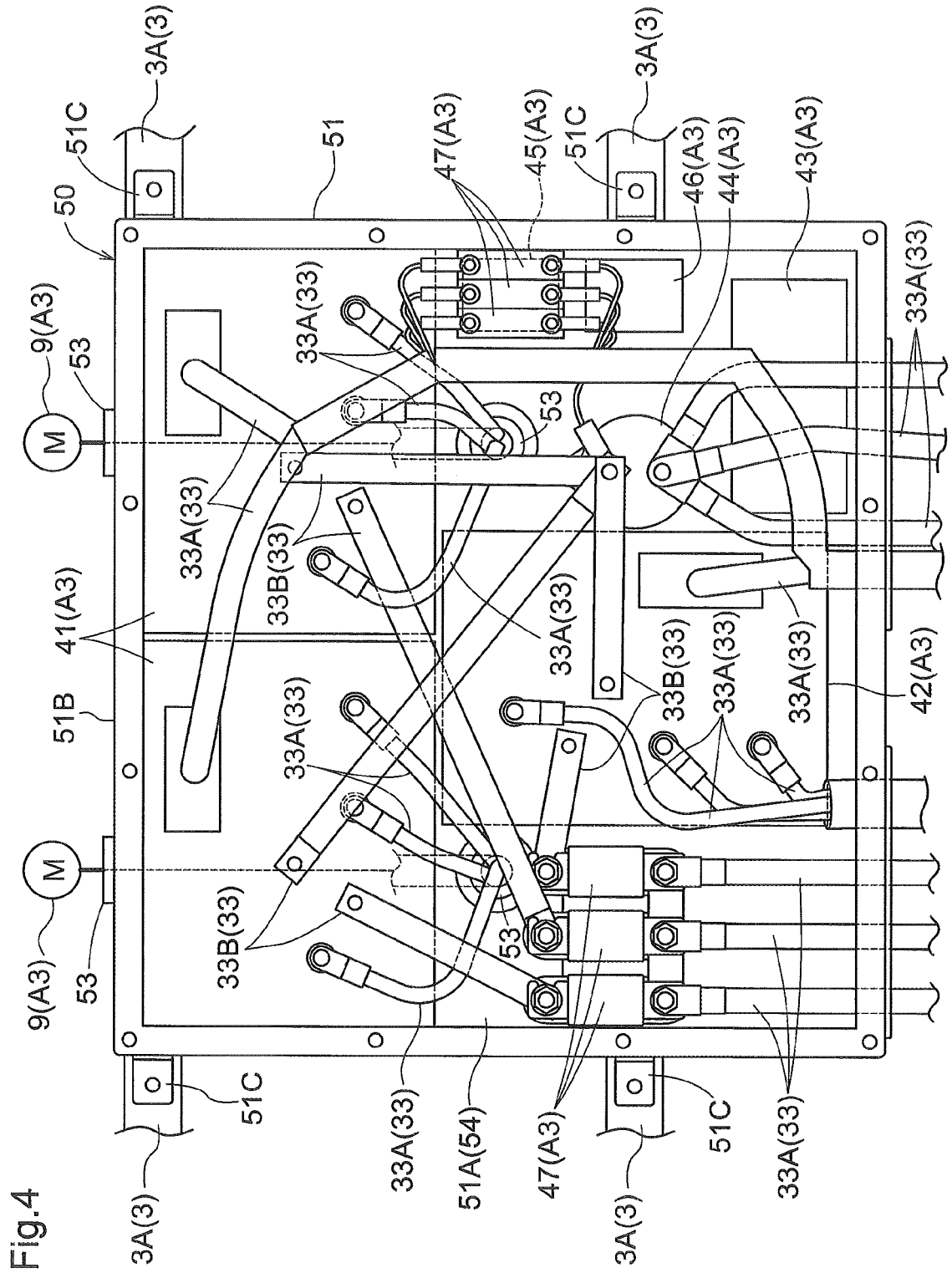
FIG. 4 is a plan view in section showing arrangements of electrical equipments accommodated in an accommodation box.

As shown in FIGS. 1-2 and FIG. 4, the accommodation box 50 includes an accommodation case 51 having an open top, an accommodation cover 52 detachably attached to the upper portion of the accommodation case 51, etc. A bottom plate 51A and a front plate 51B of the accommodation case 51 define a plurality of exit openings for allowing exit of the high-voltage cables 33A therethrough. At the exit opening forming portions of the bottom plate 51A and the front plate 51B, there are attached grommets 53 for protecting the high-voltage cables 33A.

The accommodation case 51 includes a plurality of connecting portions 51C to be bolt-connected to an accommodation case support portion 3A of the vehicle body frame 3.

With the above, attachment/detachment of the accommodation box 50 to/from the vehicle body can be easily carried out by bolt connection or connection release of the respective connecting portions 51C relative to the support portion 3A of the vehicle body frame 3.

As shown in FIGS. 1 and 2, the accommodation box 50 is disposed near the battery 8, the right and left traveling motors 9 and the implement motor 16.

With the above arrangement, the high-voltage cables 33A extending from the plurality of high-voltage electrical equipments A3 accommodated in the accommodation box 50 to the battery 8 or the motors 9, 16 are made shorter.

As a result, power loss reduction and cost reduction are made possible.

In the accommodation box 50, its bottom plate (an example of "wall-face forming member") 51A supporting the respective inverters 41, 42, the converter 43, etc. functions as a heat sink 54.

With the above arrangement, heat generated from the respective inverters 41, 42, the converter 43, etc. can be discharged speedily to the outside of the accommodation box via the bottom plate 51A.

Consequently, it is possible to suppress rise of temperature inside the accommodation box due to heat generation by the respective inverters 41, 42, the converter 43, etc.

The accommodation box 50 includes a packing (not shown) for sealing the gap between the accommodation case 51 and the accommodation cover 52.

With the above arrangement, the dust protection performance and water protection performance of the accommodation box 50 are enhanced, so that the respective high-voltage electrical equipments A3, the respective conductive bars 33B, etc. inside the accommodation box can be effectively protected against intrusion of dust, rainwater, etc.

As a result, with use of high-voltage electrical equipments A3 having low dust protection and water protection performance, cost saving is made possible.

As shown in FIGS. 1 and 2, the accommodation box 50 is disposed near the battery 8 and the respective motors 9, 16.

With the above arrangement, the high-voltage cables 33A extending from the plurality of high-voltage electrical equipments A3 accommodated in the accommodation box 50 to the battery 8 or the motors 9, 16 are made shorter.

As a result, power loss reduction and cost reduction are made possible.

Other Embodiments

The present invention is not limited to the arrangements of the foregoing embodiment. Next, some typical further embodiments of the present invention will be shown exemplarily.

[1] The configuration of the work vehicle can be modified in many ways.

For instance, the work vehicle can be configured as a semi-crawler type having right and left front wheels 4 and right and left crawlers as its traveling devices.

For instance, the work vehicle can be configured as a full-crawler type having right and left crawlers as its traveling devices.

For instance, the work vehicle can be configured as a hybrid type having an engine and an electric motor.

For instance, the work vehicle can omit the implement motor 16, but include a plurality of traveling motors 9. As such plurality of traveling motors 9, it is conceivable to include four traveling motors 9 for individually driving the right and left front wheels 4 and the right and left rear wheels 5; two traveling motors 9 consisting of one front wheel driving motor for driving the right and left front wheels, and the other rear wheel driving motor for driving the right and left rear wheels; or two traveling motors 9, each one of them driving the right and left front wheels or the right and left rear wheels 5.

For instance, the work vehicle can omit the traveling motors 9, but include a plurality of implement motors 16. As such plurality of implement motors 16, it is conceivable to include a plurality of implement motors 16 for individually driving a plurality of implements (the mower unit 2, etc.) connected to the vehicle body; or a plurality of implement motors 16 for individually driving a plurality of blades 14 mounted on the mower unit 2, etc.

For instance, the work vehicle can include, as the electric motor, an electric motor for oil supply for driving a hydraulic pump provided in the vehicle body.

For instance, the work vehicle can include a plurality of batteries 8 for outputting high-voltage DC powers.

For instance, the work vehicle can include the battery 8 for outputting high-voltage DC power and a battery for outputting low-voltage DC power.

[2] The work vehicle is not limited to the electric grass mower shown in the foregoing embodiment.

Figure 5:
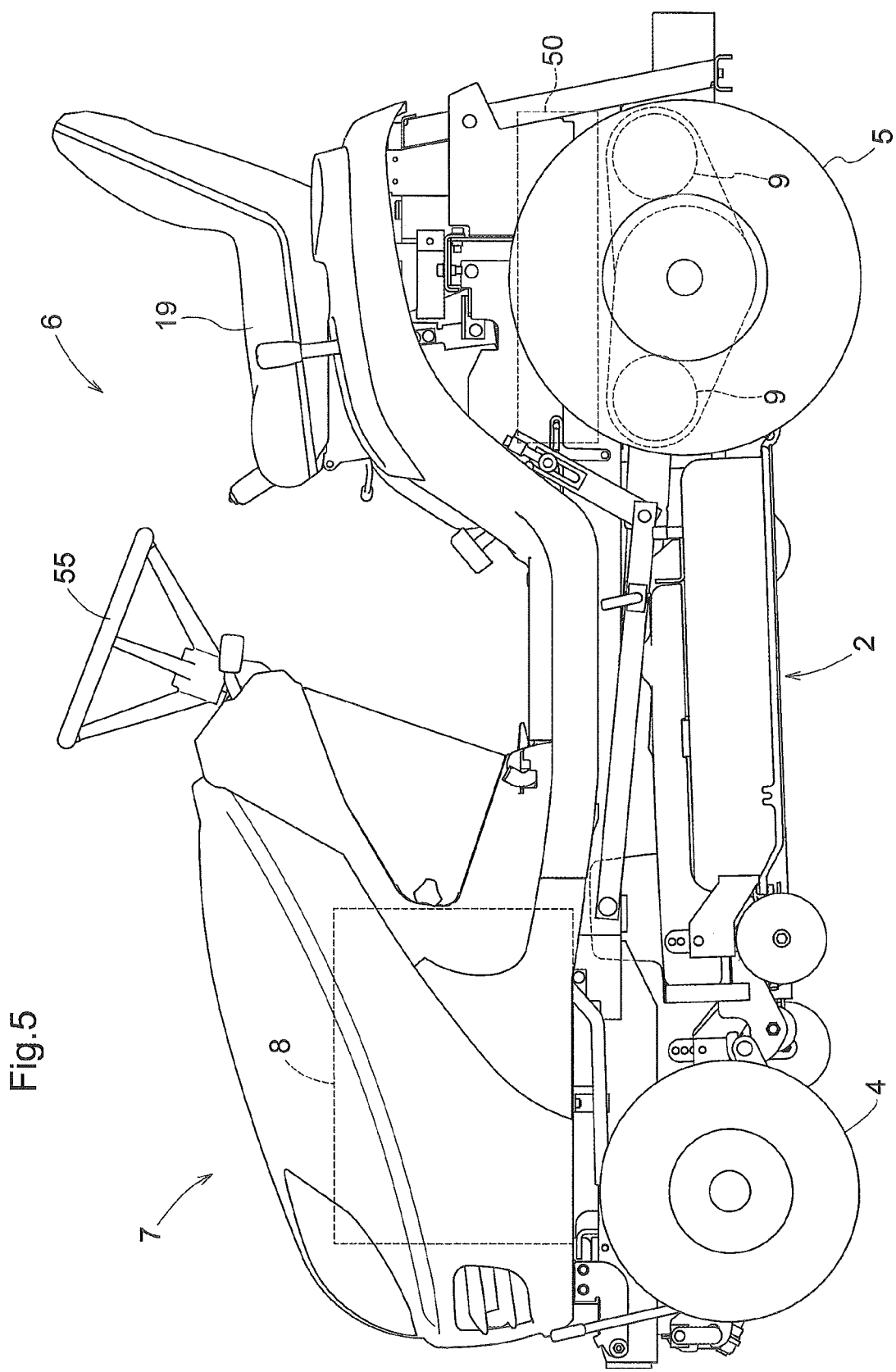
FIG. 5 is a left side view of an electric tractor as another example of the work vehicle, according to a further embodiment of the work vehicle.

For instance, as shown in FIG. 5, it can be configured as a so-called lawn tractor in which an electric mower unit (an example of an implement device) 2 is mounted between right and left front wheels (an example of a traveling device) 4 and right and left rear wheels (an example of a traveling device) 5 of the traveling vehicle body 1, and the right and left front wheels 4 are steered by an operation of a steering wheel 55.

With reference to FIG. 5, in this lawn tractor, a riding type driving section 6 is disposed on a rear side of the traveling vehicle body 1. A battery accommodation portion 7 is disposed on a front side of the traveling vehicle body 1 for accommodating a rechargeable battery 8. And, at a position downwardly of a driver's seat 19 in the driving section 6, there are disposed front and rear traveling motors (electric motors) 9 for driving the right and left rear wheels 5 and an accommodation box 50 attachable/detachable to/from the vehicle body.

Though not shown, this lawn tractor, substantially same as the zero-turn mower illustrated in the foregoing embodiment, includes the various kinds of first low-voltage electrical equipments A1, the second low-voltage electrical equipments A2 and the high-voltage electrical equipments A3. And, in the accommodation box 50, there are accommodated the respective traveling inverters 41, the implement inverter 42, the converter 43, the main relay 44, the inverter relay 45, the hold relay 46 and the various kinds of fuses 47, of the plurality of high-voltage electrical equipments A3. Namely, in this lawn tractor too, the plurality of high-voltage electrical equipments A3 such as the two traveling inverters 41, the implement inverter 42, the converter 43, etc. can be modularized. As a result, the assembly and maintenance readiness of the respective high-voltage electrical equipments A3 is improved. Also, as the plurality of high-voltage electrical equipments A3 are accommodated in the accommodation box 50, reduction of man-hours and cost required for measures for electric shock protection for the respective electrical equipments A3 can be realized.

[3] The work vehicle is not limited to the electric grass mower as shown in FIG. 1 or the lawn tractor as shown in FIG. 5. The present invention is applicable also to other grass mower than the electric grass mower, other work vehicles such as a tractor other than the lawn tractor, a front loader, a rice planter, a combine, or a multi-purpose work vehicle, etc.

Therefore, the implement too is not limited to the mower unit 2 shown in the foregoing embodiment. In accordance with the type of the work vehicle, the implement can be a rotary cultivator, a manuring machine, a chemical dispensing machine, a seeding machine, a grass collecting device, etc.

[4] The electric motor is not limited to the traveling motors 9 or the implement motor 16 as described and shown in the foregoing embodiment, but can be a motor generator having a function as a generator. Further, as the electric motor, in addition to the AC motor, a brushless DC motor can be employed.

[5] The inverters can be not only the traveling inverters 41 and the implement inverter 42, but e.g. an oil supply inverter for supplying AC current after the conversion to an electric motor for oil supply.

[6] Various changes can be made in the plurality of high-voltage electrical equipments A3 accommodated in the accommodation box 50.

For instance, the plurality of high-voltage electrical equipments A3 accommodated in the accommodation box 50 can be comprised of two traveling inverters 41 only.

For instance, the plurality of high-voltage electrical equipments A3 accommodated in the accommodation box 50 can be comprised of two implement inverters 42 only.

For instance, the plurality of high-voltage electrical equipments A3 accommodated in the accommodation box 50 can be comprised of only two inverters, including one traveling inverter 41 and one implement inverter 42.

For instance, the plurality of high-voltage electrical equipments A3 accommodated in the accommodation box 50 can be comprised of one inverter for oil supply, and at least one of the traveling inverter 41 and the implement inverter 42.

For instance, as the accommodation box 50, there can be provided a traveling accommodation box 50 and an implement accommodation box 50, with the traveling accommodation box 50 accommodating the plurality of high-voltage electrical equipments A3 including at least two traveling inverters 41, the implement accommodation box 50 accommodating the plurality of high-voltage electrical equipments A3 including at least two implement inverters 42.

For instance, in the case of a work vehicle having a voltage boosting converter, this voltage boosting converter can be accommodated in the accommodation box 50 together with the at least two inverters 41, 42.

[7] The configuration of the accommodation box 50 can be modified in many ways.

For instance, the accommodation box 50 can be configured such that the plurality of inverters 41, 42 is supported by at least one of wall-face forming members of the front plate 51B, the rear plate, the right side plate and the left side plate and the top plate (i.e. at least one wall-face forming member other than the bottom plate 51A), whereby such one wall-face forming member supporting the plurality of inverters 41, 42 functions as a heat sink.

For instance, the accommodation box 50 can be configured such that the plurality of inverters 41, 42 is supported by some of the plurality of wall-face forming members including the bottom plate 51A, the front plate 51B, the rear plate, the right side plate, the left side plate and the top plate, whereby these wall-face forming members supporting the plurality of inverters 41, 42 function as a heat sink.

For instance, the accommodation box 50 may be configured such that the wall-face forming member(s) supporting the plurality of inverters 41, 42 do not function as a heat sink.

For instance, the accommodation box 50 can be configured such that connectors are provided at the plurality of exit openings (outlets) for withdrawing the high-voltage cables 33A, and the high-voltage cables 33A provided inside the accommodation box and the high-voltage cables 33A provided outside the accommodation box are connected by these connectors.

[8] The voltage of each high-voltage electrical equipments A3 can be any high voltage equal to or higher than 36V, other than 48V voltage as described and shown in the foregoing embodiment.

What is claimed is:
1. A work vehicle comprising:
a vehicle body;
a battery that outputs a direct current (DC) power;
at least two electric motors;
at least two inverters, each of the inverters being configured to convert the DC power from the battery into an alternate current (AC) power and to supply the AC power to one of the electric motors associated therewith;
an electronic control unit for controlling operation of the at least two electric motors; and an accommodation box attachable/detachable to/from the vehicle body, the accommodation box accommodating a plurality of electrical equipment including the inverters, wherein the electronic control unit is located outside of the accommodation box.

2. The work vehicle of claim 1, further comprising:

a right traveling device and a left traveling device that support the vehicle body;

wherein the electric motors include at least one right traveling motor for driving the right traveling device and at least one left traveling motor for driving the left traveling device; and the inverters include at least two traveling inverters for supplying the AC power to one of the traveling motors associated therewith.

3. The work vehicle of claim 1, further comprising:

a right traveling device and a left traveling device that support the vehicle body;

an implement device configured to be detachably connected to the vehicle body;

wherein the electric motors include at least one right traveling motor for driving the right traveling device, at least one left traveling motor for driving the left traveling device, and at least one implement motor for driving the implement device;

the inverters include a traveling inverter for supplying the AC power to one of the traveling motors associated therewith, and an implement inverter for supplying the AC power to the implement motor.

4. The work vehicle of claim 1, wherein the accommodation box is disposed adjacent to the battery and the electric motors.

5. The work vehicle of claim 1, wherein:

the accommodation box includes a wall-face forming member that supports the inverters; and the wall-face forming member functions as a heat sink.

* * * * *